Dec. 25, 1956      E. SHINBANE      2,775,054
LINE GUIDE FOR FISHING ROD
Filed July 19, 1954
FIG. 1.
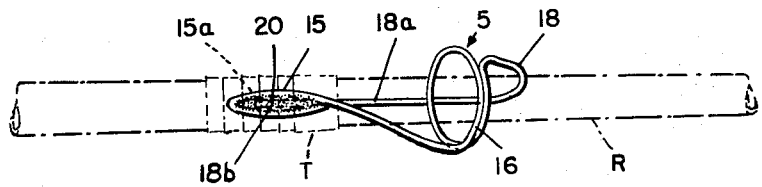
FIG. 2.
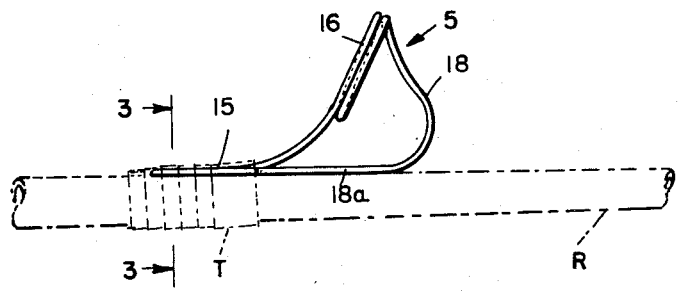
FIG. 3.
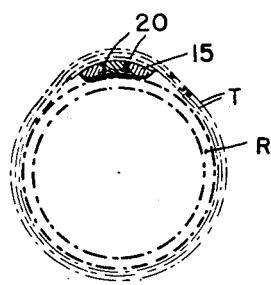
FIG. 4
INVENTOR
EDWARD SHINBANE
BY *Mason & Graham*
ATTORNEYS

United States Patent Office 2,775,054
Patented Dec. 25, 1956

2,775,054

LINE GUIDE FOR FISHING ROD

Edward Shinbane, Los Angeles, Calif.

Application July 19, 1954, Serial No. 444,017

3 Claims. (Cl. 43—24)

This invention has to do with line guides for fishing rods.

The conventional form of line guide for a fishing rod comprises a length of wire bent to form a loop, with one end of the wire extending longitudinally towards the outer end of the rod and the other end of the wire extending longitudinally towards the inner end of the rod, the two ends being bound to the rod by thread or tape in the conventional manner. However, such conventional guides are objectionable because when they are mounted they tend to stiffen the rod between the ends of the guide. Where a fishing rod is being used for casting purposes it is, of course, important that it have maximum flexibility, and thus such stiffening of the rod throughout the length of the guide may seriously interfere therewith.

It is an object of my invention to provide a line guide for fishing rods which reduces the interference with the flexibility of the rod.

Another object is to provide a guide of this character which may be mounted in less time than that required for the mounting of a conventional guide.

For purposes of explanation I shall now describe, in detail, a presently preferred embodiment of my invention, for which purpose I shall refer to the accompanying drawing wherein:

Fig. 1 is a top plan view of a line guide positioned on a portion of a rod, the rod being shown in dashed lines;

Fig. 2 is a side elevation of the rod and guide shown in Fig. 1;

Fig. 3 is an enlarged section taken on line 3—3 of Fig. 2; and

Fig. 4 is an enlarged fragmentary plan view showing the hooked left or inner end portion of the guide, prior to being formed into a lop shape and curved as shown in Fig. 3 to fit on a rod.

Referring now to the drawing, the reference letter R denotes a conventional fishing rod, the left end of which would be the inner or handle end, and the numeral 5 generally denotes my improved guide.

The guide 5 comprises a length of resilient spring wire so formed as to provide a hooked first or inner end portion 15 which, from a point adjacent the hook, curves upwardly and towards the outer end of the rod to a point at which it is formed into a loop 16. The second or outer end portion 18 of the length of wire emerges from the loop and thence curves forwardly and downwardly and then reversely toward the inner end of the rod, having a relatively substantially straight portion 18a extending longitudinally of the rod beneath the loop. It will thus be noticed that the portion 15a and the end portion 18b of portion 18 of the length of wire are in relative juxtaposition and are preferably secured together as by soldering 20.

That is, as shown in Fig. 1, end portion 15 is bent to form an elongated hook into which the free end of portion 18a extends. Thus there is provided a foot portion, to be secured to the rod by conventional wrapping, which is wider between its ends than at its ends, so as better to resist being pulled from its wrapping. As shown in Fig. 3 the foot portion is curved in cross-section to conform to the cross-sectional shape of the rod. As seen in Fig. 2, the portion 18a underlies the loop 16 in such a way that the loop 16 is afforded additional support on the rod R thereby without adding to the interference of the guide with the ability of the rod to be flexed downwardly as seen in that figure, when a fish is caught and played in the usual manner. As seen in Fig. 1, the portion 18a underlies the central portion of the loop thereby offering maximum support thereto.

At and adjacent said juxtaposed free end or extremity portions 15a and 18b the end portions of the length of wire are secured to the rod by having a conventional thread or tape T wound thereabout as shown in Figs. 1 and 2.

As shown in Fig. 1, the portion 18 of the wire emerges from the loop substantially at right angles thereto, while the straight portion 18a extends longitudinally of the rod. The loop is disposed transversely of the rod so that it opens towards the ends thereof. It is also my preference to have the whorls forming the loop extend counterclockwise when viewed by the user to prevent the line from accidentally entering between the whorls.

By the construction described, it will be observed that, since my guide is secured to the rod at only one position, from which the rod tapers, it does not tend to stiffen the rod, although the guide is held against undue flexure, because the rod may freely flex beyond the single anchor location. It is also apparent that the time required to mount my guide upon a rod is less than that required to mount a conventional guide since, in the latter case each of the oppositely extending ends of the wire must be separately bound to the rod.

I claim:

1. A line guide for a flexible fishing rod of the kind having a handle at its forward end comprising a resilient wire having a loop between its ends, a first end portion of the wire extending forwardly and downwardly and then forwardly from said loop and terminating in a rod engageable first foot portion spaced below the forwardly of said loop, a second portion of the wire extending rearwardly and downwardly from the loop and then forwardly beneath the central portion of the loop in contact with the upper surface of the rod in its normal unflexed condition, said second portion terminating in a second foot portion in juxtaposition to said first foot portion, said foot portions extending lengthwise of the upper surface of the rod, whereby said second portion is adapted to support the loop without increasing the resistance of the rod to be flexed downwardly as by a fish which may be caught on a line attached thereto, and whereby both foot portions are adapted to be secured to the rod by a single wrapping at a position spaced forwardly of the loop, and means securing said foot portions together.

2. A line guide for a flexible fishing rod of the kind having a handle at its forward end comprising a resilient wire having a loop between its ends, a first end portion of the wire extending forwardly and downwardly and then forwardly from said loop and terminating in a rod engageable first end portion extending lengthwise of the rod and spaced below and forwardly of said loop and terminating in a first foot portion, a second end portion of the wire extending rearwardly and downwardly from the loop and then forwardly lengthwise of the rod beneath the central portion of the loop in contact with the upper surface of the rod when the rod is in its normal unflexed condition and terminating in a second foot portion, whereby said second end portion is adapted to support the loop without increasing the resistance of the rod to downward flexure as by the pull of a fish which may be caught on a line attached thereto; said foot portions being secured together and defining an elongated loop-shaped rod-engaging foot wider between its ends than at its ends and of curved cross-section, whereby to be secured in substantial conforming relationship to said rod by a single wrapping at a position spaced forwardly of the first-mentioned loop and whereby to resist being pulled from said wrapping in an axial direction.

3. A line guide for a flexible fishing rod of the kind having a handle at its forward end comprising a resilient wire having a loop between its ends, a first end portion of the wire extending forwardly and downwardly from said loop and then forwardly and terminating in a first rod-engaging extremity portion spaced below and forwardly of said loop, a second portion of the wire extending rearwardly and downwardly from the loop and then forwardly spaced beneath the central portion of the loop in contact with the upper surface of said rod when said rod is in its normal unflexed condition and terminating in a second rod-engaging extremity portion in juxtaposition to said first rod-engaging extremity portion, whereby said second portion is adapted to support the loop without increasing the resistance of the rod to be flexed downwardly as by a fish which may be caught on a line attached thereto; said rod-engaging extremity portions extending lengthwise of the upper surface of said rod and being secured together and shaped to define a foot which is wider between its ends than at its rearward end whereby to be securable to the rod by a single wrapping in a manner to resist being pulled from said wrapping in the direction of said loop.

References Cited in the file of this patent

UNITED STATES PATENTS

| | | |
|---|---|---|
| 730,492 | Tideman | June 9, 1903 |
| 1,844,044 | Pflueger | Feb. 9, 1932 |
| 1,937,972 | Madden | Dec. 5, 1933 |
| 2,328,541 | Bachlotte | Sept. 7, 1943 |
| 2,398,862 | Sarkisian | Apr. 23, 1946 |
| 2,573,647 | Marke | Oct. 30, 1951 |

FOREIGN PATENTS

| | | |
|---|---|---|
| 14,281 | Great Britain | 1912 |
| 935,832 | France | July 1, 1948 |